Oct. 16, 1934.     O. WÜNSCHE     1,977,333
DAMPING DEVICE
Filed March 24, 1933
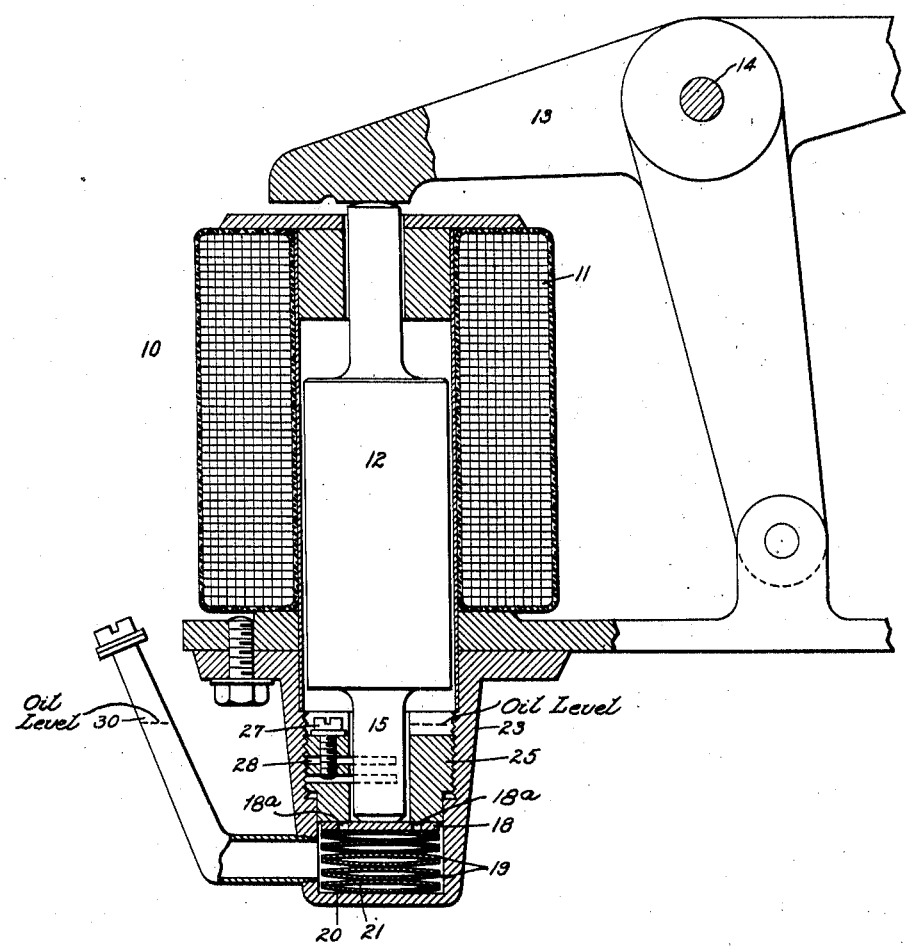
Inventor:
Otto Wunsche,
by Charles E. Tullar
His Attorney.

Patented Oct. 16, 1934

1,977,333

UNITED STATES PATENT OFFICE 1,977,333

DAMPING DEVICE

Otto Wünsche, Berlin, Germany, assignor to General Electric Company, a corporation of New York Application March 24, 1933, Serial No. 662,636
In Germany April 30, 1932

3 Claims. (Cl. 188—94)

My invention relates to damping devices, more specifically to damping devices for absorbing knocks or hammer blows incident to the operation of apparatus, and has for an object the provision of an inexpensive damping device which is practically free from wear and tear and in which precision in manufacture need not be taken into account.

Heretofore various means have been employed in reducing the intensity of the hammer blows or knocks occurring in the operation of certain types of apparatus; for example, damping devices have been used which operate by the displacement of a column of oil or by air-cushioning. In both of these types of damping very precise machining is required and the wear of the parts, incident to use, causes the damping characteristics to vary materially. Furthermore, much is yet to be desired in accomplishing the damping action after the working stroke of the apparatus has been completed.

In carrying out my invention in one form thereof, I provide a damping device consisting of a plurality of sheet-steel discs each of which is initially bent and I submerge the discs in a damping liquid such as oil so that the damping is accomplished by the compression of the discs and by the displacement of the oil from between the discs.

For a more complete understanding of my invention, reference should now be had to the drawing wherein I have shown in sectional elevation apparatus embodying my invention.

Referring now to the drawing, I have shown my invention in one form as applied to a solenoid 10 provided with a magnet coil 11 and a movable element or armature 12. When the coil 11 is energized the movable element 12 moves upwardly to rotate an operating arm 13 about its pivot 14. A similar coil may be arranged on the opposite end (not shown) of the operating arm 13 to move the arm to its original position. The lower end 15 of the movable element 12 is arranged to strike a perforated pressure disc 18 which in turn rests on a plurality of slightly bent or dished sheet-steel discs 19. These discs, for example the discs 20 and 21, are cup-shaped or of concavo-convex shape and are arranged so that the disc 20 is concave upwardly and the disc 21 is concave downwardly to provide oil chambers between them. The casing 23 is provided with oil which serves as a damping medium and also as a lubricant for the armature or movable element 12. An adjusting screw 25 is provided in the casing 23 so that the sheet-steel disc assembly 19 can be placed under a predetermined initial pressure, the magnitude of which can be adjusted at will. It will, therefore, be observed that the damping characteristics can be adjusted without difficulty by varying the initial tension or stress on the sheet-steel discs or by varying the number of the resilient discs. The adjusting screw 25 can be locked into a given position by means of a screw 27 which extends through the slot 28 of the adjusting screw 25. On tightening up the locking screw 27 the threads of the adjusting screw are pressed against the counter threads on the casing 23.

It will be observed that the resilient sheet-steel discs 19 do not require special operations during manufacture, the only requirement being that they be cupped a predetermined amount. In performing the damping function it will be observed that the blow delivered by the armature 12 is delivered directly to the pressure disc 18 which partially absorbs the energy of the blow so that the discs 19, assembled in complementary relation, are only indirectly strained. As a result of the blow on the discs, the oil between adjacent discs is forced from the space between them. The wear on the sheet-steel discs is practically negligible since these are immersed in oil or the damping liquid; therefore, the damping device is practically free of wear and tear. It will also be observed that when the magnet winding is in operation the armature 12 is drawn upwardly and on deenergization the armature falls so that the reduced portion 15 strikes the oil in the container 23, causing oil to be splashed upwardly to lubricate the whole core. Since the adjusting screw 25 fits fairly close to the reduced portion 15 of the armature 12, a certain amount of damping occurs before the armature 12 strikes the pressure disc 18. When the reduced portion 15 strikes the pressure disc 18 each of the pressure discs 19 is compressed a slight amount, thereby absorbing a portion of the blow due to its resiliency. The remainder of the force of the blow is absorbed by the displacement of the oil between the concavo-convex discs.

The apertures 18a in the perforated plate 18 are provided to permit the damping liquid or oil to flow into the region around the plunger thereby lubricating the plunger 12. As the plunger strikes the plate 18 and compresses the discs the oil is forced through the apertures 18a and also into the inlet pipe 30. Upon the release of the pressure on the discs 19 the oil flows between the discs due to leakage, this leakage flow being accentuated by the atmospheric pressure external to each pair of cooperating discs 19.

An oil inlet pipe 30 is provided for introducing additional oil into the casing 23.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A damping device comprising a casing, a damping liquid in said casing, a plurality of resilient discs formed with concave surfaces immersed in said damping liquid said concave surfaces of said adjacent discs being arranged in complementary relation with each other, a pressure plate for transmitting pressure blows to said discs, an adjusting screw for producing a predetermined initial tension on said discs, said screw being provided with a passageway, and means movable through said passageway for applying pressure blows to said discs.

2. A damping device for a solenoid provided with a plunger comprising a casing into which one end of said plunger extends, a damping liquid in said casing, a plurality of resilient discs formed with concave surfaces immersed in said damping liquid in complementary relation with each other, a pressure plate for transmitting pressure blows to said discs, an adjusting screw for producing a predetermined initial stress on said discs, said screw being provided with a passageway, and means mounting said plunger for movement through said passageway for applying pressure blows to said discs.

3. A damping device for a solenoid provided with an operating plunger comprising a casing supported adjacent said solenoid for receiving one end of said plunger, a damping liquid in said casing, a plurality of resilient discs formed with concave surfaces immersed in said liquid in complementary relation with each other, a pressure plate for transmitting pressure blows to said discs, an adjusting screw arranged in screw threaded relationship with said casing for producing a predetermined initial stress on said discs, said screw being provided with a passageway through its center, and means mounting said plunger for movement through said passageway for applying pressure blows to said pressure plate, said discs absorbing a substantial part of the energy of each pressure blow.

OTTO WÜNSCHE.